(12) United States Patent
Danwoody

(10) Patent No.: US 7,350,362 B2
(45) Date of Patent: Apr. 1, 2008

(54) SELF-HEATING/COOLING CONTAINER

(75) Inventor: Paul Robert Danwoody, Oxfordshire (GB)

(73) Assignee: Crown Packaging Technology, Inc., Alsip, IL (US)

( * ) Notice: Subject to any disclaimer, the term of this patent is extended or adjusted under 35 U.S.C. 154(b) by 421 days.

(21) Appl. No.: 10/514,952

(22) PCT Filed: Apr. 30, 2003

(86) PCT No.: PCT/EP03/04489

§ 371 (c)(1),
(2), (4) Date: Mar. 16, 2005

(87) PCT Pub. No.: WO03/097481

PCT Pub. Date: Nov. 27, 2003

(65) Prior Publication Data

US 2005/0160743 A1 Jul. 28, 2005

(30) Foreign Application Priority Data

May 17, 2002 (EP) .................................. 02253509

(51) Int. Cl.
*F25D 5/00* (2006.01)
*B65B 63/08* (2006.01)
*F24J 1/00* (2006.01)

(52) U.S. Cl. ............................ 62/4; 62/60; 126/263.06

(58) Field of Classification Search ..................... 62/4, 62/60; 126/263.01, 263.08, 263.09, 263.06
See application file for complete search history.

(56) References Cited

U.S. PATENT DOCUMENTS

| 3,970,068 | A | * | 7/1976 | Sato ........................ 126/263.08 |
| 4,773,389 | A | | 9/1988 | Hamasaki .................... 126/263 |
| 4,784,678 | A | * | 11/1988 | Rudick et al. .................... 62/4 |
| 5,257,755 | A | * | 11/1993 | Moser et al. ............... 244/3.16 |
| 6,103,280 | A | * | 8/2000 | Molzahn et al. ............. 426/109 |
| 6,178,753 | B1 | * | 1/2001 | Scudder et al. ................... 62/4 |
| 2001/0029741 | A1 | * | 10/2001 | Peters et al. ...................... 62/4 |

FOREIGN PATENT DOCUMENTS

| WO | WO 99/01102 | | 1/1999 |
| WO | WO 01/24672 | A1 | 4/2001 |

* cited by examiner

*Primary Examiner*—William C Doerrler
(74) *Attorney, Agent, or Firm*—Woodcock Washburn LLP

(57) ABSTRACT

A self-heating or self-cooling container, which uses a chemical reaction to effect heating or cooling. The reagents for the chemical reaction are stored separately in two sealed compartments (5, 6) having a common dividing wall (7), which can move within the compartments to expand the volume of one compartment at the expense of the other compartment. This arrangement allows efficient use of space within the reaction module of the can, which is particularly important where large amounts of reagent are required to obtain the necessary heating or cooling effect and where the products of the chemical reaction occupy a significantly increased volume compared to the initial reagent in the compartment.

14 Claims, 1 Drawing Sheet

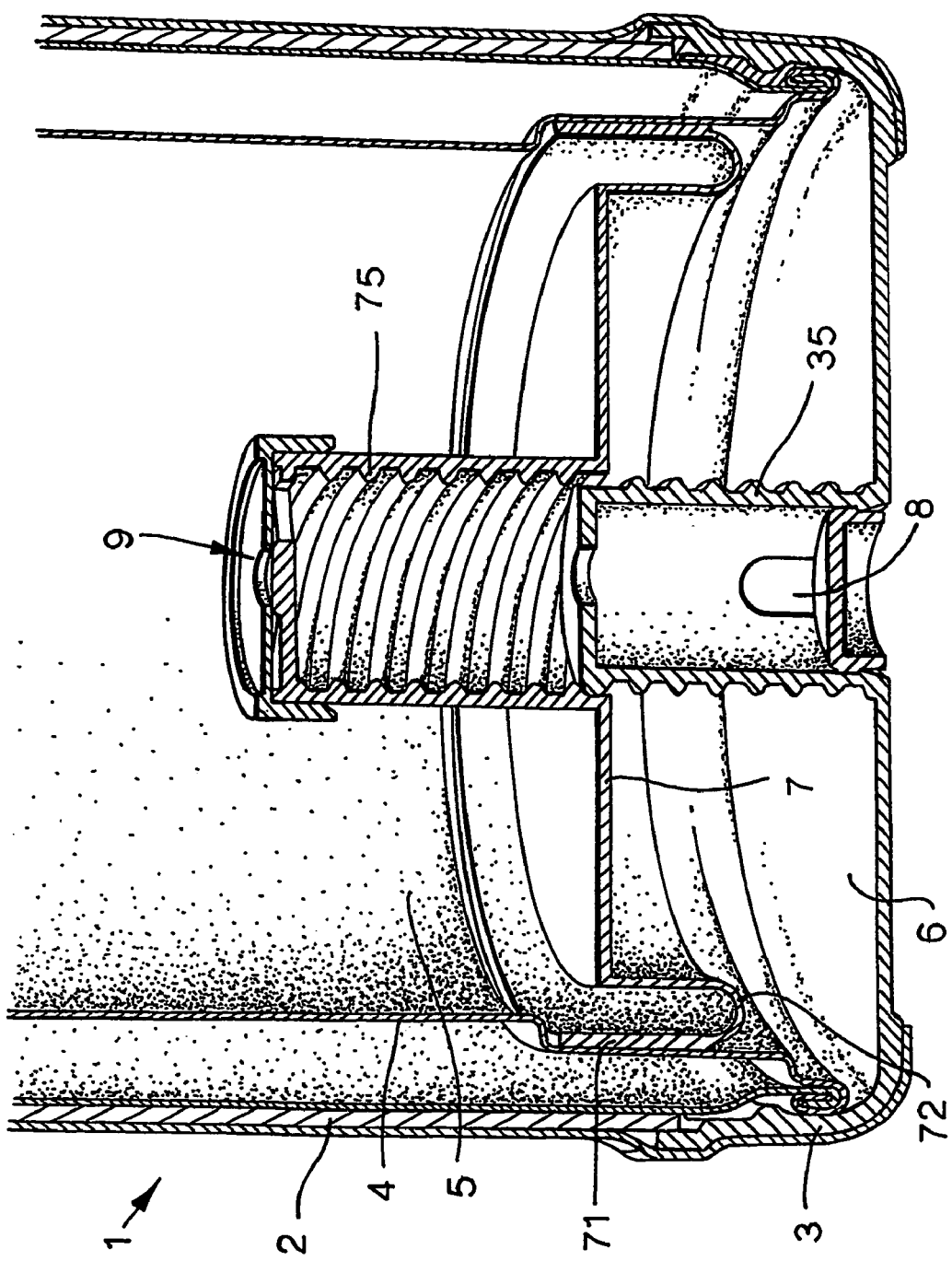

SELF-HEATING/COOLING CONTAINER

The present invention relates generally to self-heating or self-cooling containers, which effect heating or cooling using an exothermic or endothermic chemical reaction respectively. Such containers usually have at least two compartments to hold the reagents for the chemical reaction, separately, in an inert state. When heating or cooling is required, the reagents are mixed and an exothermic or endothermic reaction occurs. In particular, the present invention concerns an arrangement, which is designed to optimise the volume of the container occupied by the reagents for the chemical reaction.

Many such self-heating/self-cooling containers have been suggested in the prior art. However, in the containers according to the prior art a significant volume of the container is taken up by the chemical reagents, which have to be held separately (in sealed compartments), prior to activation of the reaction. Usually, one of the reagents is fed into the compartment containing the other reagent, when the reaction is initiated, leaving it's own compartment empty. This empty compartment then effectively becomes "dead" or wasted space.

In addition, during some reactions, the products formed during the reaction occupy a larger volume than the original reagent, thereby causing an increase in pressure within the reaction chamber, which has to be released, either by destroying part of the reaction chamber or by some pressure release means. This is true of the popular exothermic reaction suggested in much of the prior art for self-heating cans, lime+water. This exothermic reaction is popular, because the reagents are low cost and both the reagents and products of the reaction are relatively harmless. A problem with this reaction is that a relatively large volume of lime is required to obtain the necessary heat output from the reaction. Furthermore, on addition of the water to the lime, the lime can swell by as much as 40%, thereby occupying an even larger volume. This means that a self-heating container using this exothermic reaction has to be relatively large and the proportion of the container occupied by the product is relatively small.

In such containers, the reaction chamber is filled with lime and upon activation of the can by a user, water is fed into the reaction chamber where it reacts with the lime to form a product, which occupies a larger volume than the original lime. Thus, either the pressure in the reaction chamber increases, making the container dangerous to handle or part of reaction chamber has to rupture in order to relieve the pressure in the chamber.

In the present invention, the reaction module of the container has two compartments, having a common, moveable wall. Thus, as one of the reagents is expelled from its compartment (the reservoir) into the other compartment (the reaction chamber) the reaction chamber may absorb the volume vacated by the expelled reagent by movement of the common wall. Thus, the volumes of the reservoir and the reaction chamber may be optimised to take up as little volume as possible, because any increase in volume required by the reaction chamber as a result of the chemical reaction, can be recovered from the volume vacated by the reagent in the reservoir. This arrangement means that the volume occupied by the reaction vessel may be minimised, allowing more room for the product to be heated or cooled.

Accordingly, the present invention provides a container adapted to self-heat or self cool, the container comprising a first compartment for holding the product to be heated or cooled, a reaction chamber for holding a first reagent, and a reservoir for holding a second reagent, wherein the first and second reagents are chosen such that upon mixing an exothermic or endothermic chemical reaction occurs to effect heating or cooling of the product respectively, characterised in that the reaction chamber and the reservoir have a common dividing wall, which is adapted to move, to increase the volume of the reaction chamber, whilst decreasing the volume of the reservoir.

Such containers usually comprise a body and some form of actuation means, either in the form of a push-button or a rotateable base section. Upon actuation of the container, a flow path is created between the compartments containing the first and second reagents and the chemical reaction is thereby initiated. As the reagent in the reservoir is used up, the common dividing wall between the reaction chamber and the reservoir can move, increasing the volume of the reaction chamber at the expense of the reservoir. This allows the reaction chamber to accommodate any increase in volume occupied by the products of the chemical reaction. Furthermore, the "dead space" which would normally arise in the reservoir is reallocated to the reaction chamber and therefore remains in use.

In a preferred embodiment of the invention, the container comprises a body section and a base section, adapted to rotate relative to one another. The base section is coupled to the common dividing wall by a screw thread arrangement. The user of the can initiates the chemical reaction by turning the base of the can relative to the body. This in turn, moves the common dividing wall to reduce the volume of the reservoir whilst increasing the volume of the reaction chamber. Preferably, the reduction in volume of the reservoir, drives the reagent held therein into the reaction chamber, activating and feeding the chemical reaction.

Advantageously, the volumes of the reaction chamber and the reservoir are chosen such that as the reagent from the reservoir is expelled into the reaction chamber, the products produced by the chemical reaction expand, moving the common dividing wall and thereby reducing the volume of the reservoir. This in turn forces more reagent from the reservoir into the reaction chamber. Thus, the reaction becomes self-fuelling.

The invention will now be described, by way of example only, with reference to the accompanying drawing, in which:

FIG. 1 shows a side section view through a self-heating can according to the invention having a screw thread arrangement to move the common dividing wall between the reservoir and the reaction chamber.

Referring to FIG. 1, a self-heating can 1 comprises a body 2 and a base 3, which is rotateable relative to the body 2. An insert 4, is seamed to the open end of the body 2 and, together with the base, defines a reaction chamber 5 for a first reagent (e.g. lime) and a reservoir 6 for a second reagent (e.g. water). A common dividing wall 7 is provided between the reaction chamber 5 and the reservoir 6. The periphery of the dividing wall 71 is attached to the insert 4 via a flexible diaphragm 72, which accommodates the movement of the common dividing wall 7. The base 3 and dividing wall 7 are provided with mutually co-operating screw threads 35, 75. A flow path 8 is defined, through the centre of the screw threads 35, 75 between the reservoir 6 and the reaction chamber 5. The flow path 8 is normally closed by a valve 9, which opens in response to increased pressure within the reservoir.

In use, a user rotates the base 3 of the can 1 relative to the body 2. The base thread 35, is coupled to the base and rotates therewith. However, the dividing wall screw thread is provided as part of the dividing wall, which is anchored to the insert 4, which is itself anchored to the body 2 and therefore cannot rotate. Thus, the dividing wall screw thread progresses along the base thread and thereby moves the dividing wall axially within the reaction chamber 5/reservoir 6. This movement is accommodated by the flexible diaphragm 72, which unrolls. By use of this arrangement, the reaction chamber 5 increases in volume at the same time as the reservoir 6 decreases in volume.

To take the specific, exothermic reaction of lime+water. The reaction chamber 5 is filled with dry lime and the reservoir 6 is filled or at least partly filled with water. A user activates the exothermic reaction, by twisting the base 3 of the can. This in turn moves the dividing wall 7, reducing the volume of the reservoir 6. This volume reduction pressurises the water in the reservoir 6, which opens the valve 9, to allow the water into the reaction chamber 5. As the user continues to rotate the base 3, more water is transferred from the reservoir 6 into the reaction chamber 5. At the same time, the volume of the reaction chamber 5 is increased into the space previously occupied by the water in the reservoir 6. Thus, the reaction chamber can now accommodate the expansion of the lime, without destroying the dividing wall 7 between the reservoir 6 and the reaction chamber 5.

This can arrangement is particularly efficient because the space vacated by the second reagent is not wasted but instead is used to accommodate any expansion of the reaction products.

Many other methods of actuating the common dividing wall will be apparent to those skilled in the art, as well as different ways of collapsing the volume occupied by the reservoir. For example, the reservoir may be provided as a pouch, which naturally collapses once the contents thereof is expelled.

The invention claimed is:

1. A container adapted to self-heat or self cool the container comprising:
   a first compartment for holding a product to be heated or cooled,
   a reaction chamber for holding a first reagent,
   a reservoir for holding a second reagent, and
   an unbreakable barrier wall between the reaction chamber and the reservoir that is adapted to separate the first reagent from the second reagent and is adapted to move to increase volume of the reaction chamber and decrease volume of the reservoir,
   wherein the first and second reagents are chosen such that upon mixing an exothermic or endothermic chemical reaction occurs to effect heating or cooling of the product, respectively.

2. A container according to claim 1, wherein the container further comprises a body and an actuator arranged to move relative to one another such that movement of the actuator relative to the body opens a flow path between the reservoir and the reaction chamber thereby allowing the second reagent to mix with the first reagent.

3. A container according to claim 2, wherein the actuator is adapted to rotate relative to the body.

4. A container according to claim 2, wherein the actuator is coupled to the common unbreakable barrier wall, and movement of the actuator relative to the body moves the unbreakable baffler wall relative to the reaction chamber and the reservoir.

5. A container according to claim 4, wherein the actuator and the common unbreakable barrier wall are connected by a mutually co-operating screw thread anangement and the screw thread anangement drives the movement of the common unbreakable barrier wall.

6. A container according to claim 4, wherein the movement of the common unbreakable barrier wall forces the second reagent from the reservoir into the reaction chamber.

7. A container according claim 4, wherein the reservoir and the reaction chamber are connected by a normally closed flow path, which is opened upon movement of the actuator relative to the body.

8. A container according to claim 7, wherein the flow path is normally closed by a valve, which opens in response to movement of the actuator.

9. A container according to claim 2, wherein the actuator initiates the chemical reaction and thereafter expansion of the reaction products in the reaction chamber moves the common unbreakable barrier wall, reducing the volume of the reservoir and thereby forcing more of the second reagent into the reaction chamber.

10. A container according to claim 2, wherein the actuator is coupled to the unbreakable barrier wall, and movement of the actuator via rotation relative to the body moves the unbreakable baffler wall relative to the reaction chamber and the reservoir.

11. A container according to claim 10, wherein the actuator and the common unbreakable barrier wall are connected by a mutually co-operating screw thread arrangement and the screw thread arrangement drives the movement of the unbreakable barrier wall.

12. A container according to claim 11, wherein the movement of the unbreakable barrier wall forces the second reagent from the reservoir into the reaction chamber.

13. A container according to claim 12, wherein the reservoir and the reaction chamber are connected by a normally closed flow path, which is opened upon movement of the actuator relative to the body.

14. A container according to claim 13, wherein the flow path is normally closed by a valve, which opens in response to movement of the actuator.

* * * * *

UNITED STATES PATENT AND TRADEMARK OFFICE
CERTIFICATE OF CORRECTION

PATENT NO. : 7,350,362 B2
APPLICATION NO. : 10/514952
DATED : April 1, 2008
INVENTOR(S) : Paul Robert Dunwoody It is certified that error appears in the above-identified patent and that said Letters Patent is hereby corrected as shown below:

On Title Page,
Item (12) United States Patent
Delete "Danwoody" and insert -- Dunwoody --.

On Title Page,
Item (75) Inventor
Delete "Paul Robert Danwoody" and insert -- Paul Robert Dunwoody --.

Column 4,
Line 8, delete "baffler" and insert -- barrier --.
Line 34, delete "baffler" and insert -- barrier --.

Signed and Sealed this

Twenty-eighth Day of April, 2009

JOHN DOLL
*Acting Director of the United States Patent and Trademark Office*